United States Patent [19]

McTaggart

[11] Patent Number: 5,524,748
[45] Date of Patent: Jun. 11, 1996

[54] LIFT AND CARRY ACCUMULATING CONVEYOR SYSTEM

[75] Inventor: Michael D. McTaggart, Windsor, Canada

[73] Assignee: Valiant Machine & Tool, Inc., Windsor, Canada

[21] Appl. No.: 451,207

[22] Filed: May 26, 1995

[51] Int. Cl.⁶ ........................................ B65G 25/00
[52] U.S. Cl. ........................ 198/774.3; 198/774.1
[58] Field of Search ........................... 198/774.1, 774.3, 198/777

[56] References Cited

U.S. PATENT DOCUMENTS

| | | | |
|---|---|---|---|
| 4,838,411 | 6/1989 | Rainey et al. | 198/774.3 |
| 4,951,804 | 8/1990 | McCulloch et al. | 198/774.1 X |
| 5,190,142 | 3/1993 | Stadler | 198/774.3 |
| 5,193,662 | 3/1993 | McCulloch et al. | 198/774.1 X |

Primary Examiner—James R. Bidwell
Attorney, Agent, or Firm—Gifford, Krass, Groh, Sprinkle, Patmore, Anderson & Citkowski

[57] ABSTRACT

An accumulating lift and carry conveyor system is disclosed which is particularly suitable tier conveying piston connecting rods. The conveyor includes a frame defining an arcuate conveyor section having a receiving end and a discharging end. A pair of arcuate, spaced apart and parallel stationary rails are secured to an upper end of the frame and the stationary rails are adapted to engage and support opposite sides of a workpiece. A pair of arcuate, spaced apart and parallel transfer rails are contained in between the stationary rails and are movable both between an upper and lower position as well as between a forward and a retracted position. An arcuate lift beam is disposed beneath the transfer rails while a slide assembly is disposed between the top of the lift beam and the transfer rails for enabling movement of the rails between their forward and retracted position. The lift beam is also movable between an upper and a lower position. In order to move the lift beam between its upper and lower position, a lift member is provided adjacent each end of and beneath the lift beam. These lift members are pivotal between a raised and lowered positions thus simultaneously moving the lift beam between its upper and lower position. A pair of link arms are connected via a bell crank between the lift members to ensure the lift members pivot in unison with each other.

7 Claims, 4 Drawing Sheets

LIFT AND CARRY ACCUMULATING CONVEYOR SYSTEM

BACKGROUND OF THE INVENTION

I. Field of the Invention

The present invention relates generally to conveyors and, more particularly, to a lift and carry accumulating conveyor.

II. Description of the Prior Art

There are a number of previously known lift and carry conveyors for transporting various types of parts along a conveyor line. These previously known lift and carry conveyors typically comprise a pair of spaced apart and parallel stationary rails which engage and support the part to be conveyed, such as a piston connecting rod. Additionally, a pair of transfer rails extend along the conveyor line in between the stationary rails.

These transfer rails, unlike the stationary rails, are movable both between an upper and lower position, as well as a forward and retracted position. When moved to their upper position, the transfer rails lift the part being conveyed up off of the stationary rail. When in their raised position, movement of the transfer rails to their forward position simultaneously carries the part by a distance defined by the stroke of the transfer rails between the forward and retracted position.

Once the transfer rails are in their forward position, the transfer rails are moved to their lower position again depositing the parts on the stationary rail. The transfer rails are then moved to their retracted position and the above process is continuously repeated.

In the event of a part stoppage on the conveyor line, the parts merely accumulate on the conveyor line during which time the transfer rails, when moved from their retracted to forward position merely slide along the bottom of the conveyed Although linear sections of the previously known lift and carry conveyors have functioned adequately, certain difficulties have been encountered when the conveyor system includes an arcuate section. Such an arcuate section would be necessary, for example, when necessary to change the direction of the conveyor line.

With the previously known lift and carry conveyors, the arcuate sections were simply constructed with the stationary rails. Thus, in operation, the parts would accumulate on the stationary rail and simply be pushed by the incoming parts around the arcuate conveyor section and through the subsequent conveyor section.

One disadvantage of these previously known arcuate sections, however, is that a relatively high pressure is imposed upon the parts through the arcuate section. In some cases, this pressure imposed upon the parts is sufficient to eject the part from the conveyor section. In other cases, jamming of the conveyor line has resulted. This jamming was due to the curved portion alignment of the conveyor line to the straight section.

SUMMARY OF THE PRESENT INVENTION

The present invention provides a lift and carry accumulating conveyor system which overcomes all of the above-mentioned disadvantages of the previously known devices.

In brief, the accumulating lift and carry conveyor system of the present invention comprises a frame which defines an arcuate conveyor section. This arcuate conveyor section has both a receiving end for receiving the incoming parts as well as a discharge end for discharging the parts. Typically, the arcuate section receives the parts from an incoming linear section of the conveyor system and delivers the parts at its discharge end to a further linear section of the conveyor system.

A pair of arcuate, spaced apart and parallel stationary rails are secured to an upper end of the frame. These stationary rails are adapted to engage and support the opposite sides of a workpiece. In the preferred embodiment of the invention, the workpiece is a piston connecting rod.

A pair of arcuate, spaced apart and parallel transfer rails are disposed in between the stationary rails. These transfer rails are movable between an upper and lower position, as well as between a forward and retracted position. In their lower position, the transfer rails are positioned below the stationary rails. Conversely, in their upper position, the transfer rails are positioned above the stationary rails thus lifting workpieces up off of the stationary rails. With the transfer rails in their upper position, movement of the transfer rails from a retracted and to a forward position accordingly conveys the parts by a distance equal to the stroke between the retracted and forward position. Once in their forward position, the transfer rails are moved to their lower position again redepositing the parts on the stationary rails. The transfer rails are then moved to their retracted position whereupon the above process is repeated.

In order to move the transfer rails between their upper and lower position as well as between their forward and retracted position, an arcuate lift beam is disposed immediately below the transfer rails. The lift beam is mounted by vertical slides so that the lift beam is movable between an upper and lower position. Arcuate slides are then disposed between the lift beam and the bottom of the transfer rails which permit the transfer rails to move between their retracted and forward position relative to the lift beam.

In order to move the lift beam between its upper and lower position, and simultaneously move the transfer rails between their upper and lower position, a pair of lift members are disposed beneath the lift beam so that one member is positioned adjacent the receiving end of the conveyor line while the other lift member is disposed adjacent the discharge end of the conveyor line. Each lift member includes a pivotal arm so that pivoting the arm vertically displaces the lift member which simultaneously vertically displaces the lift beam.

In order to synchronize the pivotal action of the lift members thereby preventing any cocking of the transfer rail during movement between its upper and lower position, a bell crank is pivotally secured to the frame at a midpoint between the receiving and discharge ends of the arcuate conveyor section. A first link arm is then attached between one lift member and the bell crank while, similarly, a second link arm is attached between the bell crank and the other lift member. Pivotal action of one lift member thus ensures synchronous pivotal action of the other lift member via the link arms and bell crank.

BRIEF DESCRIPTION OF THE DRAWING

A better understanding of the present invention will be had upon reference to the following detailed description when read in conjunction with the accompanying drawing wherein like reference characters refer to like parts throughout the several views, and in which.

DETAILED DESCRIPTION OF A PREFERRED EMBODIMENT OF THE PRESENT INVENTION

Figure 1:
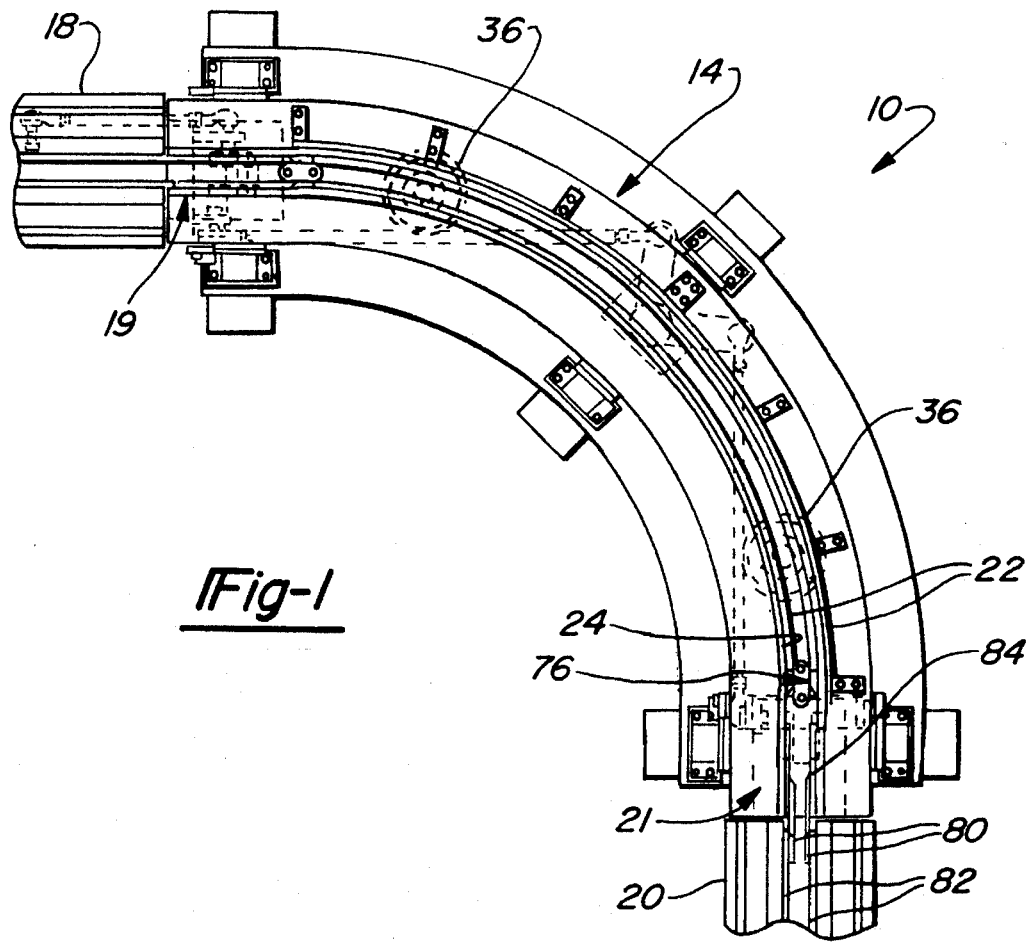
FIG. 1 is a fragmentary top plan view illustrating the preferred embodiment of the present invention.
Figure 2:
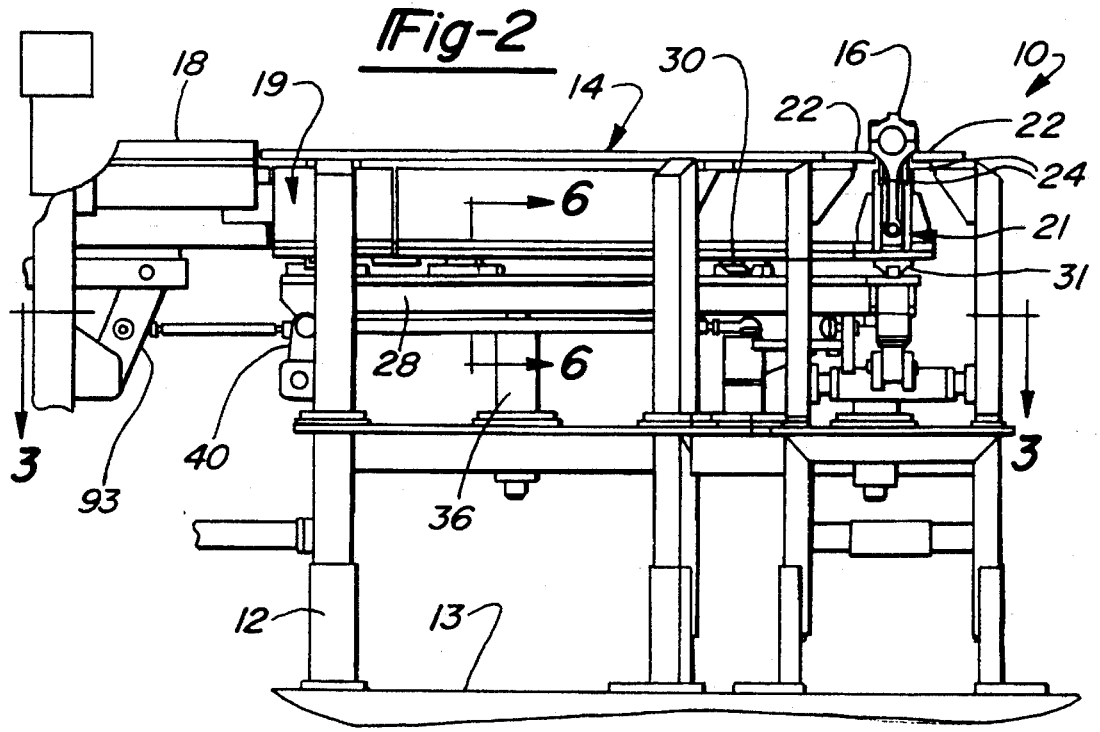
FIG. 2 is a side view of the preferred embodiment of the present invention.

With reference first to FIGS. 1 and 2, a preferred embodiment of the accumulating conveyor system 10 of the present invention is thereshown and comprises a stationary frame 12. The frame 12 supports the conveyor system 10 upon a ground surface 13. Furthermore, as best shown in FIG. 1, the conveyor system 10 includes an arcuate section 14 for transferring parts 16 (FIG. 2), such as piston connecting rods 16, from a first linear conveyor line 18 to a second linear conveyor line 20. The arcuate conveyor section 14 thus has a receiving end 19 and a discharge end 21. Furthermore, although the linear conveyor lines 18 and 20 are illustrated in FIG. 1 as being substantially at right angles to each other, they may alternatively intersect each other at any angle.

Still referring to FIGS. 1 and 2, the conveyor section 14 includes a pair of arcuate, spaced apart and generally parallel stationary rails 22 which extend from the conveyor line 18 to the conveyor line 20. These rails are secured to the frame 12 and thus do not move during the operation of the conveyor system 10.

A pair of elongated, spaced apart and parallel transfer rails 24 are mounted to the frame 12 so that the transfer rails 24 are positioned in between the stationary rails 22. Furthermore, the transfer rails 24 are parallel to the stationary rails 22 throughout their arcuate length and are secured together so that the transfer rails 24 move in unison with each other. Each end of the arcuate section 14 terminates in a straight link 76 for a reason to be subsequently described. Furthermore, the straight links 76 are connected to the arcuate section 14 such that slight pivotal movement is permitted.

Figure 4:
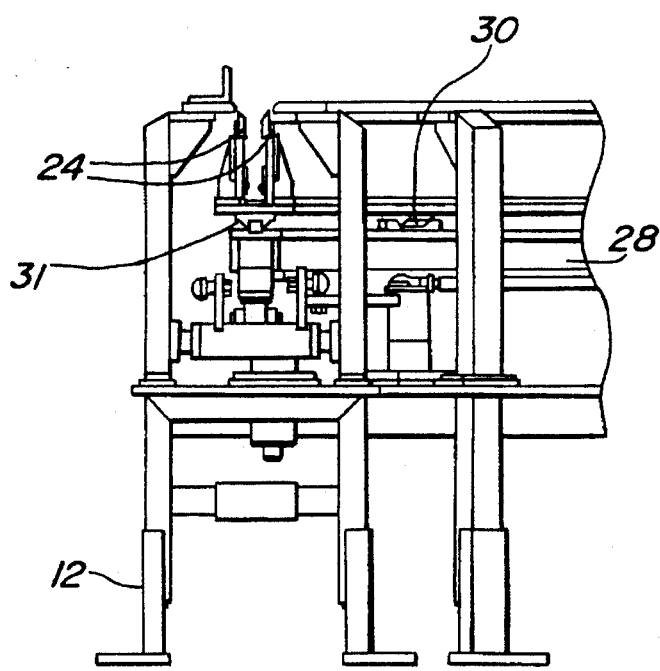
FIG. 4 is a fragmentary end view of the preferred embodiment of the present invention.

As best shown in FIGS. 2 and 4, a lift beam 28 is disposed directly beneath the transfer rails 24 throughout substantially the entire length of the transfer rails 24. As such, the lift beam 28 is also arcuate and formed along the same radius of curvature as the transfer rails 24.

Figure 6:
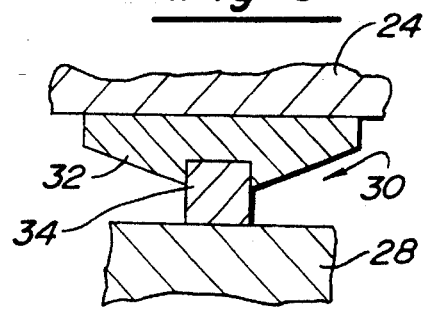
FIG. 6 is a view taken substantially along line 6—6 in FIG. 2 and enlarged for clarity.

With reference now to FIGS. 4 and 6, a central slide block assembly 30 is disposed between the bottom of the transfer rails 24 and the top of the lift beam 28 at a midpoint of the arcuate conveyor section 14. The slide block assembly 30 includes an upper arcuate slide block 32 secured to the transfer rails 24 and a lower slide block 34 secured to the lift beam 28. The lower slide block 34 is arcuate in shape and is slidably received within a like-shaped arcuate slot in the upper slide block 32. Similarly, a linear slide block assembly 31 is provided between each straight link 76 and the top of the lift beam 28. The slide block assemblies 30 and 31 are preferably linear ball bearings and enable the transfer rails 24 to longitudinally move relative to the lift beam 28. The actual movement of the transfer rails 24 relative to the lift beam 28 will be subsequently described in greater detail.

Referring again to FIGS. 1 and 2, the lift beam 28 is mounted to the frame 12 by a pair of spaced vertical slide bearings 36. The bearings 36 constrain the lift beam 28 against longitudinal displacement, but enables the lift beam 28 to move between a lower position, illustrated in FIGS. 7A and 7B an upper position, illustrated in FIGS. 8A and 8B.

Figure 3:
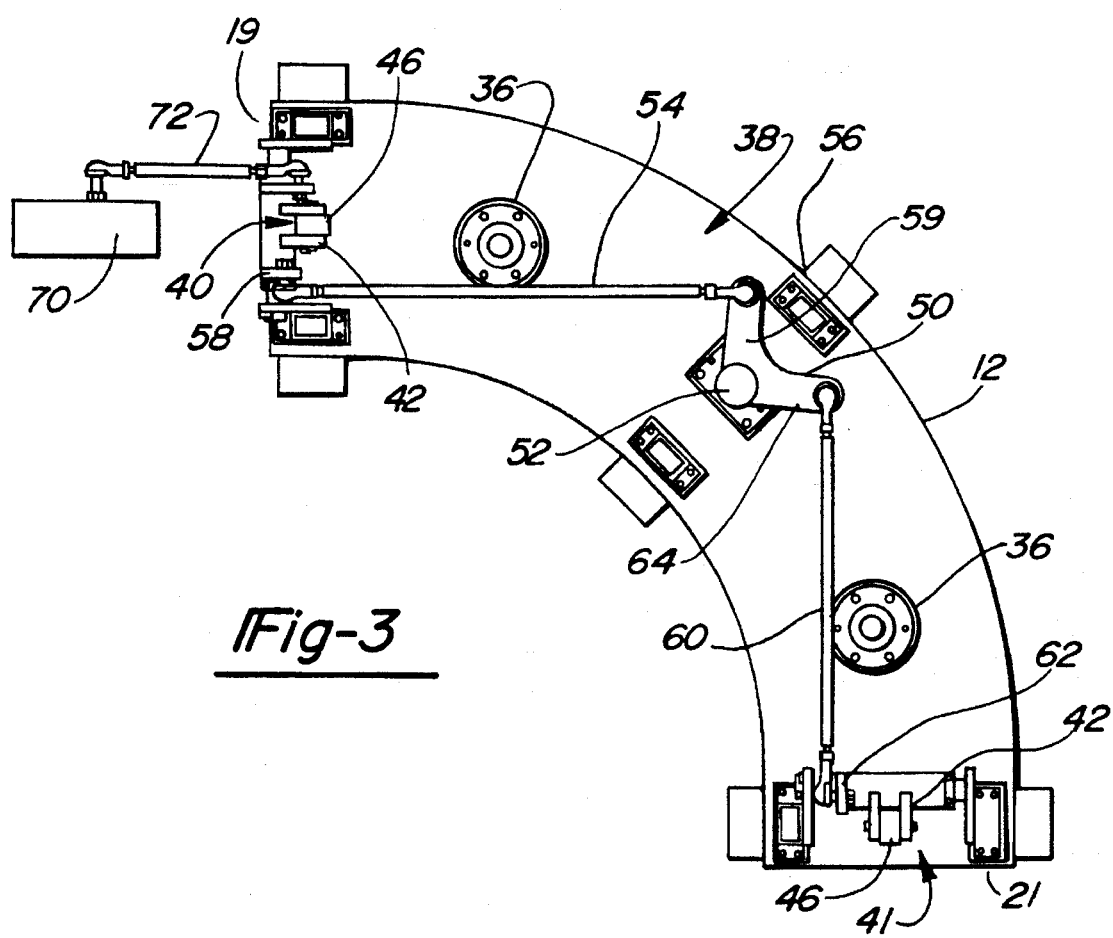
FIG. 3 is a sectional view taken substantially along line 3—3 in FIG. 2.

With reference now to FIGS. 2 and 3, the conveyor system 10 includes a lift assembly 38 mounted to the frame 12 beneath the lift beam 28. This lift assembly 38 ensures that the lift beam 28 remains precisely horizontal as it is moved between its lower position FIGS. 7A and 7B its upper position FIGS. 8A and 8B without any cocking of the lift beam 28 during operation of the conveyor system 10. This lift assembly 38 includes a pair of lift members 40 and 41 wherein one lift member 40 is positioned beneath the lift beam 28 adjacent the receiving end 19 of the arcuate conveyor section 14 while the other lift member 41 is positioned beneath the lift beam 28 adjacent the discharge end 21 of the arcuate conveyor section 14.

Figure 7A:
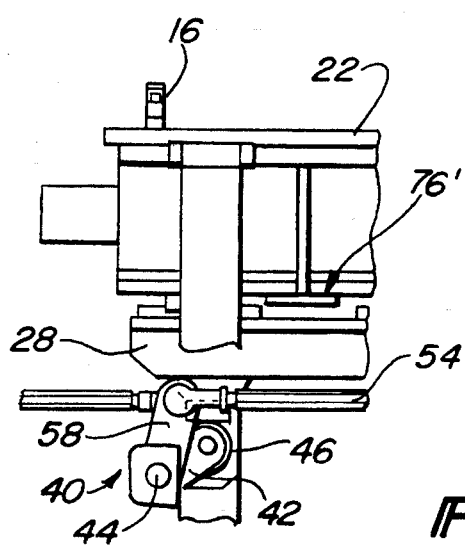
FIGS. 7A, 7B, 8A, 8B and 9A–9D are diagrammatic views illustrating the operation of the preferred embodiment of the present invention.

As best shown in FIGS. 3 and 7A, each lift member 40 and 41 includes an arm 42 having one end pivotally secured to the frame 12 by a pivot pin 44. A roller 46 is pivotally secured to the opposite end of the arm 42 and these rollers 46 abut against the bottom of the lift beam 28.

Figure 7B:
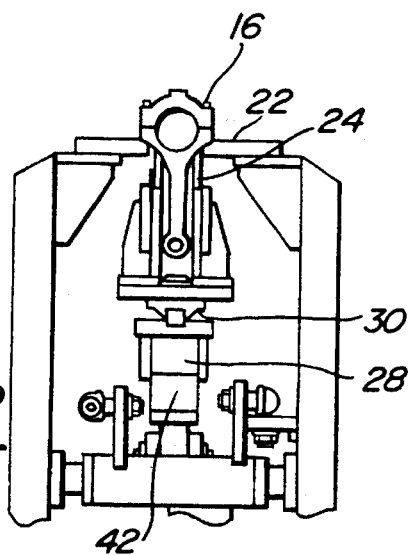
Figure 8A:
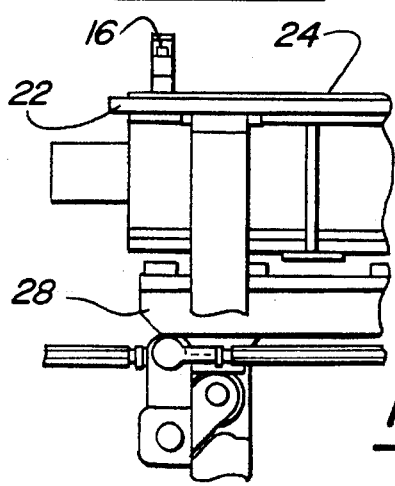
Figure 8B:
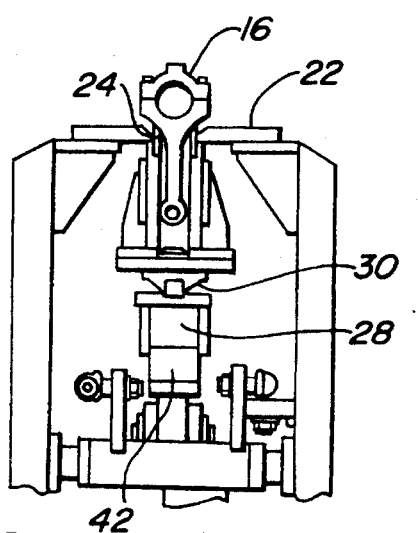

As best shown in FIGS. 7A, 7B, 8A and 8B as the lift members 40 and 41 pivot from their lower position, illustrated in FIGS. 7A and 7B to their upper position, illustrated in FIGS. 8A and 8B the lift members 40 and 41 simultaneously move the lift beam 28 from its lower position FIGS. 7A and 7B to its upper position FIGS. 8A and 8B. Subsequent pivoting of the lift members 40 and 41 from their position illustrated in FIGS. 8A and 8B to their position illustrated in FIGS. 7A and 7B again lowers the lift beam due to the weight of the lift beam 28, as well as the transfer rails 24.

With reference again to FIG. 3, in order to ensure that the lift members 40 and 41 pivot in unison with each other and thereby maintain the lift beam in a horizontal position during movement, a bell crank 50 is pivotally mounted by a pin 52 to the frame 12. An elongated link 54 extends between an actuating arm 58 on the lift member 40 and one arm 59 of the bell crank 50 (see also FIG. 7A). Similarly, a second elongated link 60 extends between an actuating arm 62 on the lift member 41 and the other arm 64 of the bell crank 50.

Referring to FIG. 3, any conventional drive means 70 can be used to pivot the lift members 40 and 41 between their upper and lower positions. For example, a drive link 72 is pivotally connected between one lift member 40 and the vertical drive mechanism (not shown) of the adjacent linear conveyor section 18 (FIG. 1). As such, the vertical and longitudinal displacement of the arcuate conveyor section 14 is synchronized with the linear conveyor section 18.

Figure 5:
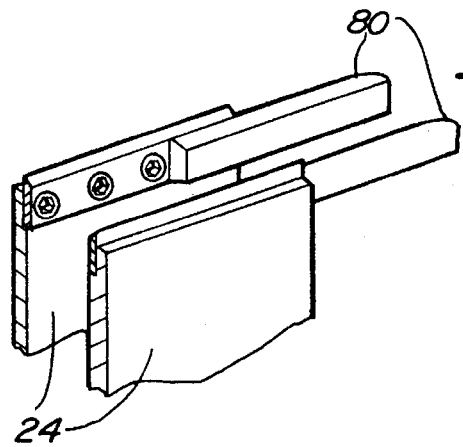
FIG. 5 is a fragmentary elevational view of a portion of the preferred embodiment of the present invention and enlarged for clarity.

With reference now to FIGS. 1 and 5, due to the power limitations of the motor used to drive the conveyor system 10, it is not practical to utilize a single motor to drive all sections of the conveyor system 10 in unison with each other. Consequently, adjacent sections of the conveyor system 10, or pairs of sections, are typically driven by separate motors which results in asynchronous operation of adjacent conveyor sections. For example, as shown in FIG. 1, the linear conveyor section 18 and arcuate conveyor section 14 are driven by one motor while the other linear conveyor section is driven by a separate motor.

In order to prevent the conveyed parts 16 from dropping through the conveyor system 10 at the intersection of two conveyor sections, as best shown in FIGS. 1 and 5, the transfer rails 24 on the arcuate conveyor section 14 each include an elongated finger extension 80. These finger extensions 80 are slidably received between the transfer rails 82 (FIG. 1) on the linear conveyor section 20 and will support the conveyed parts 16 through the junction of the linear conveyor section 20 with the arcuate conveyor section 14 despite asynchronous operation of the conveyor lines 14 and 20.

In order to prevent galling of the fingers 80 into the sides of the transfer rails 82 of the linear conveyor section 20, preferably an end section 84 of the arcuate conveyor section 14 is linearly formed and aligned with the linear conveyor section 20. The short linear section 84 of the arcuate conveyor section 14 minimizes contact between the fingers 80 and the transfer rails 82.

With reference now to FIGS. 7A, 7B, 8A, 8B and 9A–9D, the operation of the arcuate conveyor section 14 is thereshown diagrammatically. With the conveyor section 14 in the position illustrated at 90 in FIG. 9A, the transfer rails 24 are in their lower position FIGS. 7A and 7B as well as their retracted position. The lift members 40 and 41 are also in their lower position FIGS. 7A and 7B. At this time, the conveyed parts 16 are supported on the stationary rails 22.

The lift members 40 and 41 are then pivoted from their lower position FIGS. 7A and 7B to their raised position FIGS. 8A and 8B which simultaneously moves the lift beam 28 to its upper position FIGS. 8A and 8B. This movement also simultaneously moves the transfer rails 24 to their upper position illustrated at 92 in FIG. 9B. In doing so, the transfer rails 24 are positioned above the stationary rails 22 thus lifting the parts 16 up from the stationary rails 22.

Figure 9A:
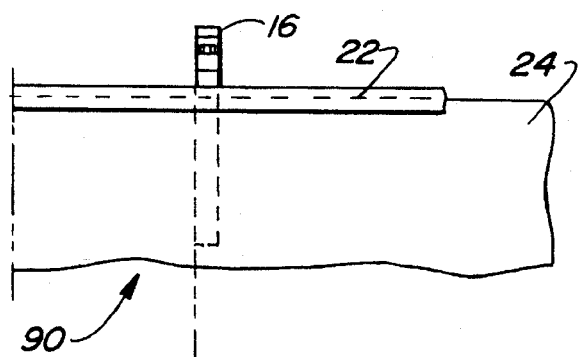
Figure 9B:
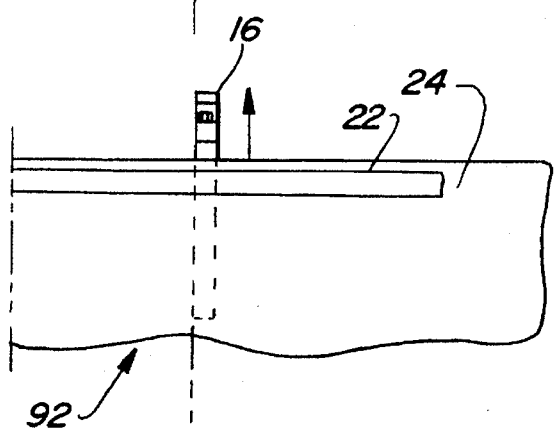
Figure 9C:
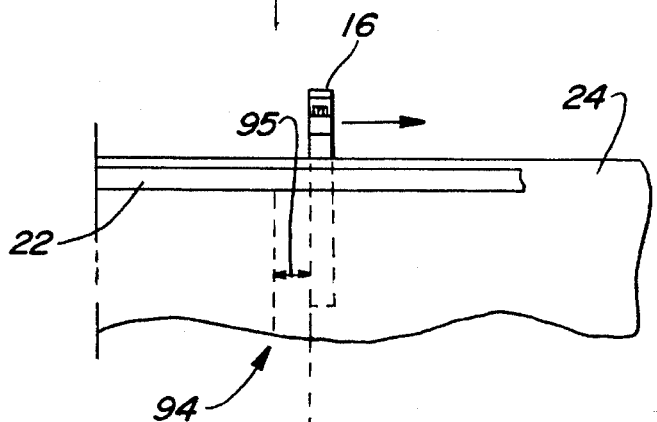

With the transfer rails 24 in their raised position, the transfer rails 24 are moved from their retracted position and to their forward position illustrated at 94 in FIG. 9C. Any conventional means 93 (illustrated only diagrammatically in FIG. 2) are used to move the transfer rails 24 from their retracted and to their forward position.

Figure 9D:
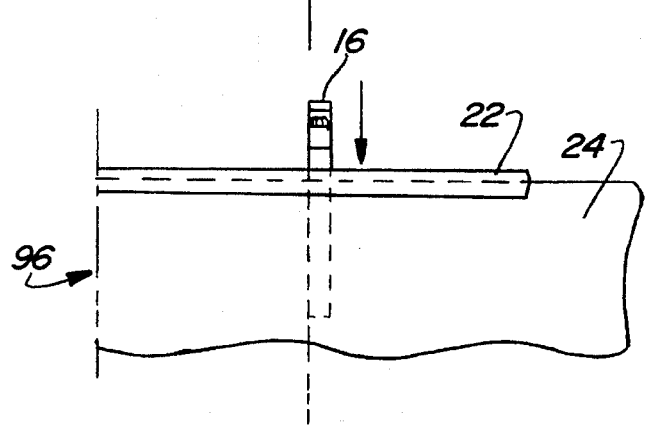

With the transfer rails in their raised and forward position, the lift members 40 and 41 are again moved to their lower position FIGS. 7A and 7B which, due to gravity, moves the transfer rails 24 to their lower position as illustrated at 96 in FIG. 9D. In doing so, the conveyed pans 16 are again redeposited upon the stationary rails 22, but at an advanced position equal to the stroke 95 (FIG. 9C). The transfer rails 24 are then moved to their retracted position, illustrated at 90 in FIG. 9A, and the above process is repeated.

Any appropriate means are used to synchronize the movement of the lift beam 28 between its raised and lowered position, as well as the movement of the transfer rails 24 between their extended and retracted position. Furthermore, as previously discussed, preferably the movement of the transfer rails 24 are synchronized with the transfer rails 24 of the adjacent linear conveyor section 18.

In practice, the arcuate conveyor section 14 has a relatively wide radius of curvature, typically about one meter. This relatively wide curvature prevents excessive forces from being imposed upon the pans 16 even during an accumulating situation and, as such, eliminates the possible ejection of the pans from the conveyor system 10.

Having described my invention, however, many modifications thereto will become apparent to those skilled in the an to which it pertains without deviation from the spirit of the invention as described by the scope of the appended claims.

I claim:

1. An accumulating lift and carry conveyor system comprising:
    a frame defining an arcuate conveyor section having a receiving end and a discharging end,
    a pair of arcuate, spaced apart and parallel stationary rails secured to an upper end of said frame, said stationary rails adapted to engage and support opposite sides of a workpiece,
    a pair of arcuate, spaced apart and parallel transfer rails,
    means for movably mounting said transfer rails in between said stationary rails between a raised and a lowered position and between a forward and retracted position,
    wherein said movable mounting means comprises
        an arcuate lift beam disposed beneath said transfer rails and means for slidably mounting said lift beam to said frame between a lower and an upper position,
        a slide assembly for slidably connecting said transfer rails to said lift beam between said forward and said retracted position,
        means for moving said lift beam between said upper and said lower position comprising a first lift member pivotally mounted to said frame beneath said lift beam and adjacent said receiving end and a second lift member pivotally mounted to said frame beneath said lift beam and adjacent said discharge end, said lift members being pivotal between a raised and a lowered position, and
        means for pivoting said lift members between said raised and said lowered positions in synchronism with each other.

2. The invention as defined in claim 1 wherein a pivotal axis of said first lift member is substantially perpendicular to a pivotal axis of said second lift member and wherein said pivoting means comprises a pair of links extending between said lift members.

3. The invention as defined in claim 2 and comprising a bell crank pivotally mounted to said frame and wherein one end of each link is pivotally secured to said bell crank.

4. The invention as defined in claim 1 wherein said transfer rails include a linear section at each end.

5. The invention as defined in claim 4 and comprising an extension secured to each transfer rail at one end thereof, each said extension having an upper edge substantially coplanar with its associated rail.

6. The invention as defined in claim 5 wherein said extensions are spaced inwardly toward each other from their respective associated transfer rails.

7. The invention as defined in claim 1 wherein said conveyor is a conveyor for piston connecting rods.

* * * * *